United States Patent
Moegele et al.

(10) Patent No.: US 9,773,500 B2
(45) Date of Patent: Sep. 26, 2017

(54) METHOD FOR ACQUIRING AT LEAST TWO PIECES OF INFORMATION TO BE ACQUIRED, COMPRISING INFORMATION CONTENT TO BE LINKED, USING A SPEECH DIALOGUE DEVICE, SPEECH DIALOGUE DEVICE, AND MOTOR VEHICLE

(71) Applicant: AUDI AG, Ingolstadt (DE)

(72) Inventors: Hannes Moegele, Guenzach (DE); Norbert Pfleger, Saarbruecken (DE); Jan Schehl, Saarbruecken (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/120,077

(22) PCT Filed: Jan. 31, 2015

(86) PCT No.: PCT/EP2015/000185
§ 371 (c)(1),
(2) Date: Aug. 18, 2016

(87) PCT Pub. No.: WO2015/124259
PCT Pub. Date: Aug. 27, 2015

(65) Prior Publication Data
US 2017/0249941 A1    Aug. 31, 2017

(30) Foreign Application Priority Data
Feb. 22, 2014   (DE) .................. 10 2014 002 543

(51) Int. Cl.
*G10L 15/22*    (2006.01)
*G10L 15/18*    (2013.01)
(Continued)

(52) U.S. Cl.
CPC ........ *G10L 15/222* (2013.01); *B60R 16/0373* (2013.01); *G10L 13/00* (2013.01);
(Continued)

(58) Field of Classification Search
CPC ............... G10L 15/22; G10L 2015/221; G10L 2015/225; G10L 15/265; G06F 17/27
See application file for complete search history.

(56) References Cited

U.S. PATENT DOCUMENTS 4,954,956 A * 9/1990 Yamakawa ......... G06F 3/04895
715/246
6,108,515 A * 8/2000 Freeman ................ G10L 15/26
360/27
(Continued)

FOREIGN PATENT DOCUMENTS

DE   103 06 082 A1   8/2003
DE   103 43 683 A1   4/2005
(Continued)

OTHER PUBLICATIONS

German Office Action dated Oct. 15, 2014 from German Patent Application No. 10 2014 002 543.8, 6 pages.
(Continued)

*Primary Examiner* — Eric Yen
(74) *Attorney, Agent, or Firm* — Staas & Halsey LLP (57) ABSTRACT

A voice output is produced by a speech dialog device between the acquisitions of two pieces of information. Each piece of information is acquired by acquiring natural verbal voice input data and extracting the respective piece of information from the voice input data using a speech recognition algorithm. When a repetition condition has been satisfied, a natural speech summary output is generated by the speech dialog device and output as a voice output which includes a natural voice reproduction of at least one previ-
(Continued)

ously acquired piece of information or a part of this piece of information or a piece of information derived from this piece of information.

13 Claims, 6 Drawing Sheets

(51) Int. Cl.
*G10L 13/00* (2006.01)
*B60R 16/037* (2006.01)

(52) U.S. Cl.
CPC .............. *G10L 15/18* (2013.01); *G10L 15/22* (2013.01); *G10L 2015/221* (2013.01); *G10L 2015/223* (2013.01); *G10L 2015/225* (2013.01); *G10L 2015/228* (2013.01)

(56) References Cited

U.S. PATENT DOCUMENTS

| | | | | |
|---|---|---|---|---|
| 2003/0083874 | A1* | 5/2003 | Crane | G10L 15/22 704/246 |
| 2005/0267759 | A1 | 12/2005 | Jeschke et al. | |
| 2006/0074670 | A1* | 4/2006 | Weng | G10L 15/22 704/257 |
| 2006/0247931 | A1* | 11/2006 | Caskey | G10L 15/22 704/270 |
| 2007/0016426 | A1* | 1/2007 | Hershey | G10L 15/26 704/277 |
| 2008/0120616 | A1 | 5/2008 | James et al. | |
| 2011/0207099 | A1* | 8/2011 | Chen | A61B 5/16 434/236 |
| 2012/0253801 | A1* | 10/2012 | Santos-Lang | G10L 15/22 704/235 |
| 2014/0081634 | A1* | 3/2014 | Forutanpour | G06F 17/289 704/235 |
| 2015/0378672 | A1* | 12/2015 | Tanaka | G06F 3/167 704/275 |

FOREIGN PATENT DOCUMENTS

| | | |
|---|---|---|
| DE | 103 42 541 A1 | 5/2005 |
| DE | 10 2006 052 600 A1 | 5/2008 |
| DE | 10 2007 043 264 A1 | 3/2009 |
| DE | 10 2014 002 543.8 | 2/2014 |
| EP | 1 560 200 A1 | 8/2005 |
| EP | 1 598 810 A2 | 11/2005 |
| EP | PCT/EP2015/000185 | 1/2015 |
| WO | 2004/051191 A1 | 6/2004 |

OTHER PUBLICATIONS

International Search Report dated Apr. 13, 2015 from International Patent Application No. PCT/EP2015/000185, 3 pages.
English translation of the International Preliminary Report on Patentability dated Aug. 31, 2016 from International Patent Application No. PCT/EP2015/000185, 9 pages.

* cited by examiner

METHOD FOR ACQUIRING AT LEAST TWO PIECES OF INFORMATION TO BE ACQUIRED, COMPRISING INFORMATION CONTENT TO BE LINKED, USING A SPEECH DIALOGUE DEVICE, SPEECH DIALOGUE DEVICE, AND MOTOR VEHICLE

CROSS REFERENCE TO RELATED APPLICATIONS

This application is a U.S. national stage of International Application No. PCT/EP2015/000185, filed on Jan. 31, 2015. The International Application claims the priority benefit of German Application No. 10 2014 002 543.8 filed on Feb. 22, 2014. Both the International Application and German Application are incorporated by reference herein in their entirety.

BACKGROUND

Described herein is a method for acquiring at least two pieces of information to be acquired, including information content to be linked, using a speech dialogue device, wherein a voice output is produced by the speech dialogue device between each acquisition of the pieces of information, wherein each piece of information is acquired by acquiring natural voice input data and by extracting the respective piece of information from the voice input data using a speech recognition algorithm, wherein, when a repetition condition has been satisfied, a natural speech summary output is generated by the speech dialogue device and output as voice output which includes a natural voice reproduction of at least one already acquired piece of information or a part of this piece of information or a piece of information which is derived from this piece of information, wherein, if more than one of the pieces of information to be acquired has already been acquired at the time when the repetition condition was satisfied, the speech dialogue device determines, as a function of a repetition parameter for each of the pieces of information which have already been acquired whether or not a natural voice reproduction of this piece of information or a part of this piece of information or a piece of information derived from this piece of information is incorporated into the summary, wherein a necessary condition for the satisfaction of the repetition condition is that an initially satisfied interrupt condition, during the satisfaction of which the acquisition of pieces of information is interrupted, is no longer satisfied.

SUMMARY

In a large number of application cases, speech dialogues are used to acquire operator control inputs of technical devices. Such voice control is appropriate, in particular, when at the time of the voice input the user carries out a further activity which at least partially takes up his attention, since when a voice input is used to control a device or to input pieces of information it is not necessary to concentrate on additional manual operator control elements. Owing to these properties, voice control systems are frequently used, in particular, in motor vehicles. It is therefore possible, for example, to control navigation systems, communication systems and multimedia devices in motor vehicles using voice input.

In a large number of application cases of voice control, it is necessary here to acquire pieces of information including information content to be linked. The term pieces of information including information content to be linked is to be understood here as meaning pieces of information which are related in terms of meaning, that is to say are linked with respect to content. Therefore, when they are input into a navigation system, the piece of information including information content to be linked can be, for example, a name of a town, the name of a road and a house number and additionally the piece of information that a route is to be planned to the location described by the further three pieces of information. A selection of a song in a multimedia system can include as pieces of information including information content to be linked, for example, the name of the artist as well as the name of the song to be played or the name of an album which includes the song and an associated song number.

In this context, a user can make available all these individual pieces of information, including information content to be linked, to a speech dialogue device within the scope of an individual voice input. However, it is frequently desired to acquire these pieces of information individually, or individual pieces of information which are necessary to carry out the task are missing from the voice input by the user, for which reason an enquiry by the system can be provided.

In particular, in the case of use in a motor vehicle, a disadvantage of such complex multi-part voice inputs with interposed voice outputs using a speech dialogue device is that at the same time as the user conducts the speech dialogue he must also carry out other tasks which, under certain circumstances, demand his attention to a large extent. In addition, events, for example incoming and received telephone calls, occur which make simultaneous voice control completely impossible. Such distractions of the driver or interrupts in the method for the acquisition of the pieces of information can lead to a situation in which a dialogue cannot be continued and, under certain circumstances, has to be carried out again from the start. This requires all the pieces of information which have already been made available by the user to be input once more into the system. This reduces the operator convenience and makes the interaction between the operator and the speech dialogue system inefficient.

U.S. Patent Application Publication 2006/0 074 670 A1 describes a method for an interactive dialogue process with a user. A voice input from a user is acquired, and at least one designation and one meaning relationship is detected. A response is generated as a function of these pieces of information and of further pieces of information of a database and is output to a user.

A speech dialogue system for controlling an electric device is described in European Patent Application Publication 1 560 200 A1. The speech dialogue can be interrupted when an interrupt command is acquired, and can be resumed when a resumption command is acquired. It is possible here to repeat preceding inputs of the user.

European Patent Application Publication 1 598 810 A2 describes a device for carrying out a dialogue. In this context, a plurality of processing devices are used which each include one or more processing rules and a plurality of memory devices. A communication which is initiated by a user is assigned to one of these processing devices, which processes the communication and stores pieces of information contained therein.

The method described herein uses a speech dialogue device where the duration for which the interrupt condition is present is acquired, after which the repetition parameter is determined as a function of this duration, and/or in which, when the interrupt condition is satisfied, the speech dialogue device determines or detects a complexity value which is a measure of the loading of a user by the event causing the interrupt, after which the repetition parameter is determined as a function of this complexity value.

The method described herein provides a user, during a dialogue for acquiring the pieces of information including information content to be linked, with, under certain circumstances, a summary of the state of the dialogue in order to remind the user of the details of the dialogue or the point of the dialogue at which he is. In this context, in particular, previous inputs within the dialogue are to be brought to the user's mind. Therefore, a natural speech summary output is generated which, according to the method described herein, includes at least one piece of information which has already been acquired or a part of this piece of information or a piece of information derived from this piece of information. It is to be noted here that the addressed function, that is to say whether, for example, a song which is to be played is to be selected for a multimedia system or an appointment is to be entered into an appointment calendar, has frequently also been acquired using the speech dialogue device and therefore also constitutes one of the pieces of information including information content to be linked. This piece of information which describes the addressed function can form here a type of parenthesis or framework for the other pieces of information, and this piece of information can, in particular, determine which further pieces of information are to be acquired and in what way their information content is linked. The type of pieces of information which are to be acquired and the way in which the information content is to be linked can, however, also be predefined in other ways, for example if the method is carried out in the motor vehicle, and another method actively starts a speech dialogue with a user.

Depending on one of the pieces of information to be acquired or on an external prescription, for each piece of information a meaning is therefore defined for each of the respective pieces of information in conjunction with the other pieces of information, that is to say semantics are defined. The pieces of information can advantageously be acquired in an ontology-based data structure, that is to say the pieces of information are assigned a context which places each of the pieces of information in relationship with the other pieces of information and/or which assigns a specific meaning to the piece of information. The assignment of the meaning can be carried out by selecting, as a function of a prescription or a first piece of information which describes the type of dialogue, a specific data structure in which the individual pieces of information are stored at predefined positions. However, additionally or alternatively the data structure can also include metadata which describe the relationship between the acquired pieces of information and/or an assigned meaning for the respective piece of information.

When the repetition condition has been satisfied, one or more pieces of information and a meaning assigned to the pieces of information or a context assigned to the pieces of information can therefore be present in the speech dialogue device. Such presence of the data permits particularly flexible generation of the summary output. In the text which follows, the procedure will be explained by way of example for the use of metadata which assign a type designator to each of the acquired pieces of information, the type designator describing a meaning of the respective piece of information. Such allocation of type designators to pieces of information is known, for example, from the "extensible markup language" (XML). The described procedure can, however, also be used for a large number of other forms of storage of pieces of information.

If a speech dialogue is initiated by a user, an addressed function can be determined from the first voice input. Such a function can be, for example, the inputting of a navigation destination, the selection of a radio station, the storage of contact data or appointments or the like. The addressed function prescribes, on the one hand, the further course of the dialogue, wherein the further dialogue can also be constructed in the form of a tree, that is to say the following voice outputs of the speech dialogue device and the type of pieces of information to be acquired can be adapted as a function of further pieces of information. On the other hand, the addressed function can already prescribe a plurality of possible structures of the summary output, wherein the specifically used structure of the summary output can be dependent on which of the pieces of information are already acquired and, in particular, on further parameters which influence, in particular, the verbosity of the summary output, that is to say, in particular, the length of the summary output or the quantity of pieces of information which are acquired and which the summary output includes. The structure of the summary output can specify here which of the pieces of information are output, at what point of the summary output these pieces of information are output, the format in which each of the pieces of information is output, the format in which the respective piece of information is output, whether the piece of information itself or a piece of information derived from this piece of information or a part of this piece of information is output and/or which further components the summary output includes.

The procedure will be described below by way of example for the control of an appointment planner using a speech dialogue device. An appointment is to be described here by using the pieces of information of the day, time of day, duration and designation of the appointment. A user has already input, by using preceding voice inputs, that an appointment is to be created, that it is to be created at 15:00 hours at Jan. 1, 2015, and that the duration of the appointment is one hour. The function, specifically appointment planning, a date, specifically Jan. 1, 2015, a time of day, specifically 15:00 hours and a duration, specifically one hour, are therefore available as data in the speech dialogue system.

At this time, a relatively long interrupt of the speech dialogue occurs, since the user is distracted by a traffic situation. Since no voice input of the user is acquired for a relatively long time, the speech dialogue device determines that the repetition condition has been satisfied and generates a summary output and outputs it. From the stored pieces of information and the metadata relating to the stored pieces of information, the speech dialogue device determines that the function of the interrupted dialogue is an appointment planning process and that pieces of information relating to a date, a time of day and a duration are already present. On the basis of these pieces of information, the speech dialogue device selects a structure for a summary output from a list of a plurality of possible structures of summary outputs. For example, a structure of the summary output is selected which includes the introductory words "we were just about to create a new appointment for", the indication of the day of the week, the date, the word "at", the time of day. The entire summary output which, after it has been generated, is output as a voice output, therefore reads "we were just about to create an appointment for Thursday, Jan. 1, 2015 at 15:00 hours". Subsequently, for example a voice output can be output in order to inquire about the designation for the appointment. In this context it is possible, as already explained, to adapt the verbosity of the summary output using further parameters. In this way, for example the duration of the appointment has not been taken into account in the described summary output. In the case of conditions which indicate increased verbosity, for example the expression "at 15:00 hours" could be replaced by the expression "from 15:00 hours to 16:00 hours". In this case, a piece of derived information, specifically the end of the appointment, would therefore be formed from two acquired pieces of information, specifically the time of day and the duration, and reproduced as part of the summary output. Of course, it would also be possible to not reproduce individual pieces of information or to reproduce only partial pieces of information. It would therefore be possible, for example, to reproduce only January 1. instead of the date Jan. 1, 2015.

A necessary condition for the satisfaction of the repetition condition is that an initially satisfied interrupt condition, during the satisfaction of which the acquisition of pieces of information is interrupted, is no longer satisfied. In this context, the interrupt condition can be satisfied, in particular, using signals of further electronic systems which are connected to the speech dialogue device. In the motor vehicle, for example a communication device can signal an incoming telephone call or the acceptance of a telephone call, a radio can signal the start of a traffic announcement, a navigation device can signal the outputting of a navigation instruction, or a driver assistance system which evaluates a traffic situation can transmit an interrupt signal when a traffic situation which satisfies a prescribed condition occurs. However, other situations which cause the interrupt condition to be satisfied can also be acquired. It is therefore possible, for example, to detect if a further vehicle occupant is speaking with the driver or the driver is speaking in such a way that clearly no interaction with the speech dialogue device is desired, which can be detected for example if no responses which match the voice outputs, in particular questions, of the speech dialogue device are acquired over a relatively long duration.

When an interrupt condition is satisfied, in particular both the acquisition of voice and the voice output can be interrupted. If the interrupt condition is no longer satisfied, and if, in particular, no further interrupt conditions are also satisfied, an automatic resumption of previously interrupted dialogue between the speech dialogue device and the user can be provided. As explained at the beginning, it is particularly advantageous after such interrupts to inform the user about the state of the dialogue, which is carried out by outputting a natural speech summary output.

The repetition condition can additionally evaluate the number of the pieces of information which have already been acquired and/or the actual pieces of information which have already been acquired and/or the duration for which the interrupt condition is present can be detected using the speech dialogue device, after which the repetition condition can additionally evaluate this duration. Alternatively or additionally, when the interrupt condition is satisfied, the speech dialogue device determines or detects a complexity value which is a measure of the loading of a user by the event causing the interrupt, as a result of which the repetition condition can additionally evaluate this complexity value.

Therefore, a summary output can, for example, be generated and output only if a plurality of pieces of information have already been acquired, since when there are a small number of pieces of information which have already been acquired it is frequently simpler to carry out the dialogue again, or the small number of pieces of information are also still available to the user and therefore do not need to be repeated. An evaluation of the pieces of information which have already been acquired within the scope of the repetition condition is advantageous, in particular if these pieces of information determine the addressed function and/or the dialogue is a branched dialogue in which the course of the dialogue, that is to say the selection of the voice outputs using the speech dialogue device and the type and/or sequence of the acquired pieces of information is dependent on pieces of information which have already been acquired. By acquiring the duration of the interrupt it is possible, in particular, in the case of short interrupts, to avoid generating and outputting a summary output, since in these cases it can be assumed that the state of the dialogue is still known to the user. Therefore, the repetition condition can, in particular, evaluate whether the duration exceeds a limiting value. In addition, a degree of loading of the user can be estimated by evaluating the type of interrupt or using pieces of information from those systems which have triggered the interrupt or the like. If the driver is heavily loaded by the event causing the interrupt, and the driver must for example carry out complex activities, it is to be assumed that the state of the dialogue is no longer known to him, for which reason a summary output should be advantageously generated and output. On the other hand, in the case of low loading during an interrupt it is probable that a user will also remember a state of the dialogue, that is to say at least the previously specified pieces of information, after a somewhat longer duration.

As mentioned in the introduction, it may be advantageous to adapt the verbosity of the summary as a function of the specific use situation of the speech dialogue system. Therefore, if more than one of the pieces of information to be acquired has already been acquired at the time when the repetition condition was satisfied, the speech dialogue device determines, as a function of a repetition parameter for each of the pieces of information which have already been acquired, whether or not a natural voice reproduction of this piece of information or a part of this piece of information or a piece of information derived from this piece of information is incorporated into the summary output.

Using the speech dialogue device it is possible to acquire the duration for which the interrupt condition is present, after which the repetition parameter is determined as a function of this duration, and/or when the interrupt condition is satisfied, the speech dialogue device determines and detects a complexity value, which is a measure of the loading of a user by the event causing the interrupt, after which repetition parameter is determined as a function of this complexity value. Alternatively or additionally, the repetition parameter can be determined as a function of the complexity of the dialogue, in particular as a function of the number of the pieces of information to be acquired. In this context, after relatively long interrupts, advantageously detailed summary outputs are generated which include a plurality of the acquired pieces of information, and after a short interrupt less detailed summary outputs are generated which include only one or a small number of the acquired pieces of information. Correspondingly, relatively high loading of the user during the interrupt or a relatively high degree of complexity of the activity of the user during the interrupt can increase the verbosity of the summary output, in particular the quantity of information items included in the summary output.

The complexity value can be influenced here by various factors. It is therefore possible that the interrupt condition evaluates a signal of a device which is connected to the speech dialogue device, wherein the connected device additionally transmits a device complexity value as a function of which the complexity value is determined. The connected device may be, for example, a driver assistance system of a motor vehicle which evaluates a traffic situation. Using this driver assistance system it is possible to determine how complex intervention by the driver during the satisfaction of the interrupt condition is necessary. Therefore, the driver assistance system can determine a device complexity value and transmit this to the speech dialogue device.

Additionally or alternatively it is also possible for the interrupt condition to evaluate signals of a plurality of devices which are connected to the speech dialogue device, wherein the complexity value is determined as a function of the connected device or the connected devices which outputs or output the signal which causes or cause the interrupt condition to be satisfied. For example, it is therefore to be expected that a driver is distracted less from a preceding dialogue after the outputting of a navigation instruction by a navigation system than after a telephone call. Therefore, for example a higher complexity value can be determined if a communication device transmits an interrupt signal than if a navigation system transmits an interrupt signal.

However, the complexity value can also be determined as a function of the dialogue itself. Therefore, the complexity value can be determined as a function of the pieces of information which are to be acquired and/or at least of one of the pieces of information which have already been acquired. In this context, it is possible, in particular, to evaluate which system is to be controlled by the dialogue or whether similar pieces of information, for example the telephone numbers of a plurality of persons or the like, are to be specified.

In addition, described herein is a speech dialogue device for a motor vehicle, which speech dialogue device is designed to carry out the method described herein. The speech dialogue device includes a voice input device for acquiring the voice input data and a voice output device for voice output.

In addition, described herein is a motor vehicle which includes a speech dialogue device.

The motor vehicle can include here at least one vehicle system which, when a signal condition is satisfied, outputs an interrupt signal to the speech dialogue device, wherein, when the interrupt signal is output, the interrupt condition is satisfied. In this context, in particular a plurality of vehicle systems can be provided which can transmit corresponding interrupt signals. In this case, each vehicle system can be advantageously assigned a complexity value as a function of which, when the dialogue is resumed, the verbosity of the summary output, that is to say, in particular, which of the acquired pieces of information the summary output includes, and the decision as to whether a summary output is generated and output, are adapted.

The other vehicle system can be, in particular, a communication device, a radio, a driver assistance system which evaluates a traffic situation, or a navigation system.

A driver assistance system which evaluates a traffic situation can be designed here additionally to determine a device complexity value as a function of the traffic situation when the interrupt signal is output. Therefore, the generation of a summary output and the specific content of the summary output, in particular the quantity of the pieces of information included therein, and the verbosity can be adapted as a function of a detected traffic situation.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Figure 1A:
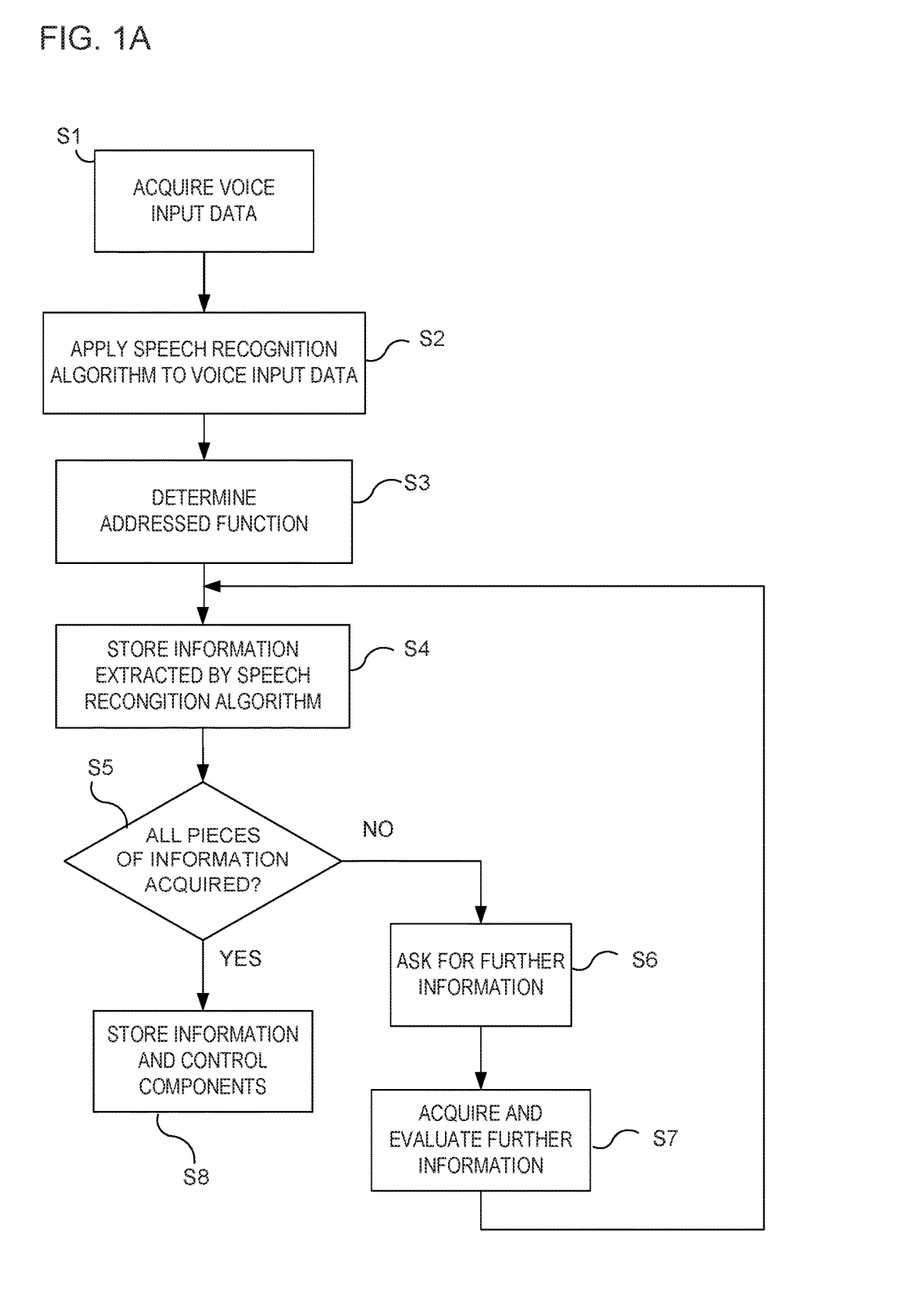
FIGS. 1A and 1B taken together form a flowchart of an exemplary embodiment of the method described herein.
Figure 1B:
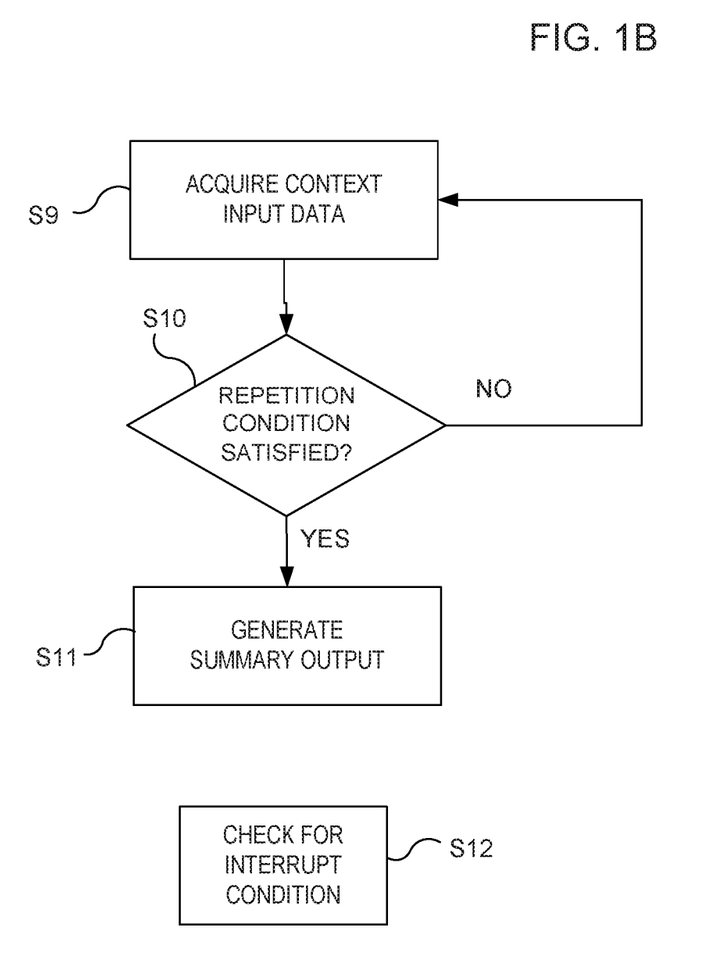

Referring to the drawings, FIGS. 1A and 1B taken together depict a schematic flowchart of a method for acquiring at least two pieces of information to be acquired and which include information content to be linked. In this context, in the method shown three sequences are carried out in parallel. In the first of these sequences, which includes SI to S8, the basic dialogue process takes place using a speech dialogue device. Such dialogue includes voice outputs using the speech device, typically enquiries to a user, and voice inputs of a user which select a dialogue, influence a dialogue process and/or input pieces of information into the speech dialogue device. In parallel with this, in S9 to S11 it is continuously checked whether a repetition condition is satisfied, and when the repetition condition is present a natural speech summary output is generated and output to the user as a voice output. As a third process, in S12 it is checked in parallel with the two other processes whether an interrupt condition is satisfied, and when this interrupt condition has been satisfied the first process of SI to S8 is interrupted, and under certain circumstances is resumed again later.

Firstly, the first process including S1 to S8 will be described. It is to be noted here that this process can be interrupted at any time by using one of the other processes, and after an interrupt has taken place it can, under certain circumstances, be continued. In S1, voice input data are firstly acquired. Therefore, the speech dialogue device includes a voice input device, for example one or more microphones. The acoustically acquired speech data are initially digitized and stored in a memory device.

In S2, a speech recognition algorithm is applied to the voice input data acquired in S1. In this context it is determined whether at least one of the pieces of information to be acquired is contained in the voice input data. If this is not the case, the acquisition of voice input data is continued until at least one piece of information is contained in the acquired voice input data. The one or more pieces of information contained in the acquired voice input data are subsequently stored. In this context, the storage of the pieces of information takes place in an ontology-based database. Each of the pieces of information is therefore assigned a meaning within the scope of the dialogue conducted by the speech dialogue device. The assignment of meaning is carried out by adding meta data to the acquired pieces of information.

In S3, the addressed function is determined. The method can be used to control a plurality of devices, and each of these devices can have different input possibilities. It is therefore possible for a speech dialogue which controls a communication device to trigger, for example, a call, to add an entry to a telephone directory or to edit such an entry or compose a text message using voice recognition. Likewise, an appointment planner can be controlled by the speech dialogue device, wherein new appointments can be created, appointment lists can be output or settings can be changed using speech dialogues. In order to control a navigation system, for example a target address for the navigation can be input, or a search for the closest refueling station can be conducted. In S3, the speech dialogue device therefore evaluates the pieces of information extracted in S2 and determines both the other pieces of information to be acquired and the voice outputs of the speech dialogue device which are output, in particular as enquiries, between acquiring the pieces of information.

In S4, the piece of information which is extracted in S2 or the pieces of information which are extracted in S2 are stored. In this context, the meta-information described in S2 is stored in relation to the pieces of information, whereby an ontology-based data structure, in which not only the extracted pieces of information but also a meaning content of the extracted pieces of information and a relationship between the pieces of information is stored, is formed.

In S5 it is checked whether all the pieces of information to be acquired have already been acquired. The number and type of the pieces of information to be acquired is defined by the function determined in S3. As explained there, it is possible that the number of the pieces of information to be acquired and the type of the pieces of information to be acquired are adapted in further acquisition operations.

If all the pieces of information to be acquired have not yet been acquired, in S6 a voice output is output using the speech dialogue device which interrogates from the user at least one further piece of information to be acquired. Therefore, by alternately interrogating pieces of information and acquiring the corresponding pieces of information a dialogue is set up. The renewed acquisition and evaluation of the further piece of information subsequently takes place in S7, as also explained with respect to S1 and S2. Subsequently, in S4 the newly acquired piece of information is also stored with associated meta-information, and in S5 it is checked again whether all the pieces of information to be acquired have now been acquired. This is repeated until in S5 it is determined that all the pieces of information to be acquired have now been acquired. In this case, the method ends in S8, after which components to be controlled can be controlled and pieces of information obtained using the speech dialogue, or the like, can be stored.

In addition to the process in S1 to S8 described above, process S9 to S11 are carried out in parallel. In S9, in this context input data are acquired using the speech dialogue device and evaluated within the scope of a repetition condition. This data includes, in particular, the time which has currently passed between a last voice output of the speech dialogue device and the acquisition of the pieces of information to be acquired. In addition, it is possible to acquire signals of operator control elements which, when activated by a user, cause a natural speech summary output to be output. In addition, the voice input data are continuously examined for the presence of a key word by which a user can cause a summary output to be generated and bring about voice output thereof.

In S10 it is checked whether the input data mentioned above satisfy the repetition condition. The repetition condition is satisfied here if the key word has been detected, an output of a summary output has been requested by the user by activating an operator control element or a predefined time interval is exceeded. If the repetition condition is not satisfied, the method is continued with S9. When the repetition condition is satisfied, the method is continued in S11, in which a summary output is generated and output. This is explained in more detail with respect to FIG. 2.

In parallel with the sequences including S1 to S8 and S9 to S11, in S12 it is continuously checked whether an interrupt condition is present, and when an interrupt condition is present the dialogue process which is described in relation to S1 to S8 is interrupted. In particular, in this context the voice output and the voice acquisition are interrupted. When an interrupt signal is no longer present, a natural speech summary output is, under certain circumstances, generated and output before the dialogue process is continued. The procedure during S12 is explained more precisely with respect to FIGS. 3A and 3B.

Figure 2:
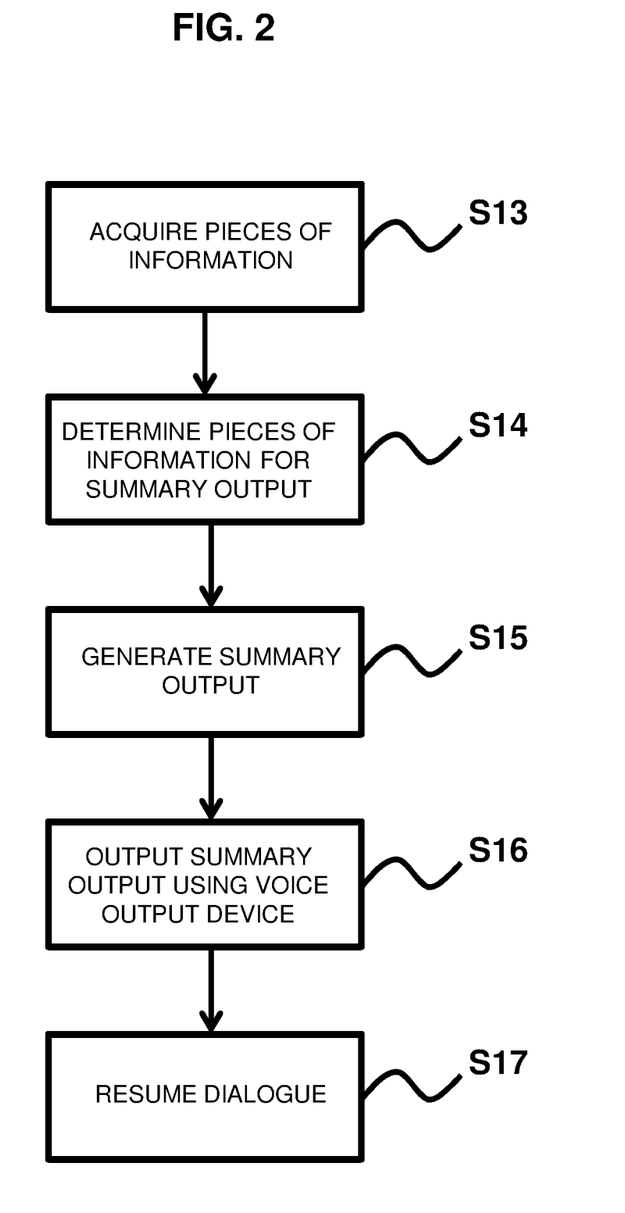
FIG. 2 is a flowchart relating to the generation and voice output of the summary output in the method in FIGS. 1A to 1B.

Referring again to the drawings, FIG. 2 shows a schematic flowchart for generating and outputting a natural speech summary output. The process S13 to S17 shown in FIG. 2 together form the process S11 shown in FIG. 1B.

In S13, there is initially acquisition of data which determine the structure of the summary output, in particular the number and selection of the pieces of information contained in the summary output as well as the method of the reproduction of the information. In this context, it is detected, in particular, what has triggered the generation of the summary output. In addition to triggering as a result of S11 in FIG. 1B being reached, a summary output can also be generated and output within S12 when interrupt of the speech dialogue ends. The type of the call determines, in particular, the further data which are taken into account for determining the verbosity of the summary output. In this context, in the case of a call owing to an interrupt, the verbosity is determined as a function of the duration of the interrupt and the complexity value determined as explained in FIGS. 3A and 3B. In the case of a call as a result of S11 being reached, there is consideration of which of the repetition conditions described with respect to S9 and S10 has been satisfied.

In S14 it is determined which of the acquired pieces of information are reproduced within the scope of the summary output. For this purpose, from the values determined in S13 a common value is determined which determines the verbosity and as a function of which one of a plurality of predefined structures for a summary output is selected. In this context, a pre-selection of a group of structures of summary outputs is made as a function of the type and number of the pieces of information acquired and the addressed function. Within this group, one of the structures is subsequently selected as a function of the determined common value. A structure of the summary output includes pieces of information, which of the acquired pieces of information is output in which form at what point, and in addition typically additional phrases for connecting the pieces of information.

In S15, the summary output is generated by inserting the acquired pieces of information into the previously determined structure of the summary output in accordance with the structure, in order to obtain a natural speech summary output.

This will be explained using the example of the inputting of a navigation destination. In this type of dialogue, the type of dialogue, a town, a road and a house number are provided as the pieces of information to be acquired. In this context, all the pieces of information have already been acquired apart from the house number. If "Munich" was acquired as the town and "Innere Wiener Straße" was acquired as the road, it is therefore possible to generate as a detailed summary output "we were just about to create a destination input to "Innere Wiener Straße, Munich". By using the "destination input", the addressed function, specifically the determination of a navigation destination, is specified, and by using "Munich" and "Innere Wiener Straße" the location and the road are specified. Therefore, all three previously acquired pieces of information are reproduced. However, depending on the specified parameters, in particular the duration and the complexity value, it may be advantageous to generate a relatively short summary output. The summary output can also be generated here together with the enquiry as to the next piece of information to be acquired. Therefore, for example the sentence "which house number in the Innere Wiener Straße is to be driven to?" could be generated as a summary output.

The summary output is subsequently output in S16 using a voice output device, and in S17 the system returns to the sequence shown in process S1 to S8 in FIG. 1A. In this context, it is possible, in particular, to return to the point in the method at which the last voice output was made by the speech dialogue device, that is to say S6 of the respective pass through the loop S4 to S7. If the corresponding enquiry has already been included in the summary, the method is continued as S7, and otherwise with S6. In parallel with this, the execution of process S9 to S11 is started again in S9.

Figure 3A:
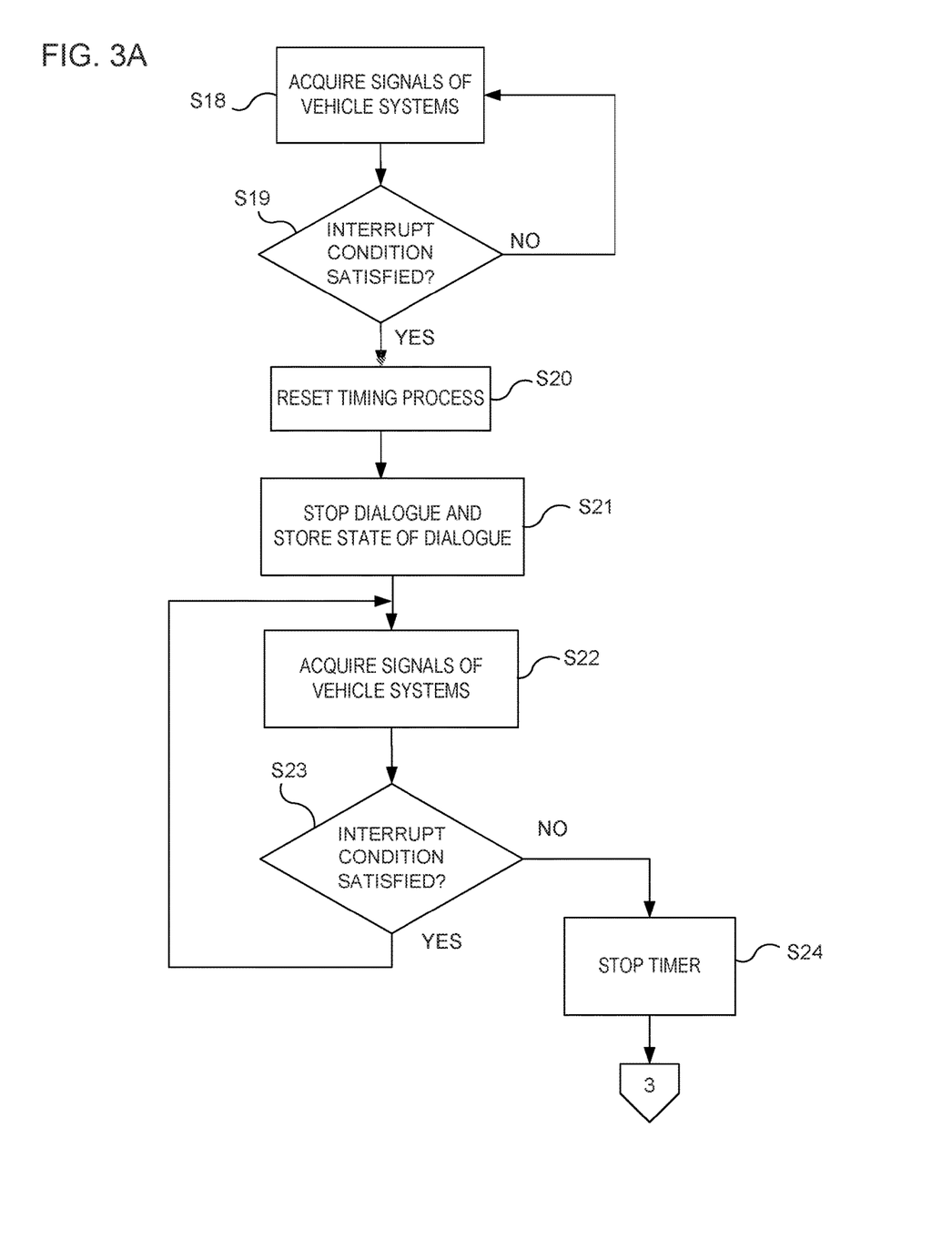
FIGS. 3A and 3B taken together form a flowchart of the acquisition of the interrupt condition and the reaction to the presence of the interrupt condition in the method in FIGS. 1A to 1B.
Figure 3B:
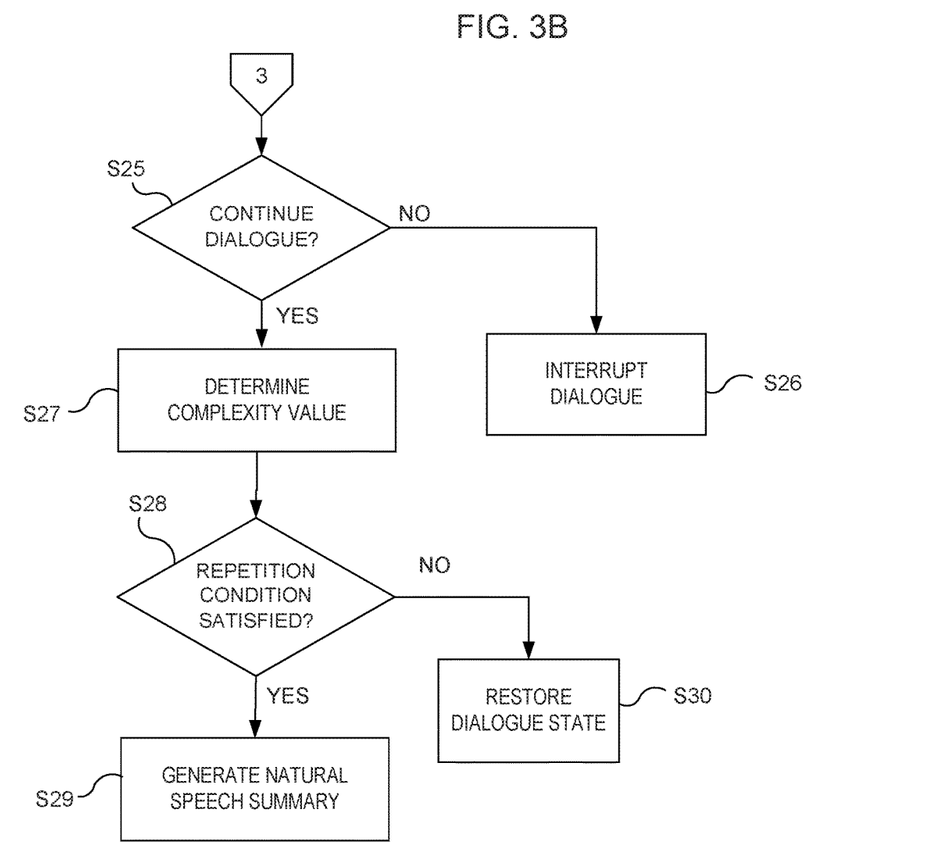
Figure 4:
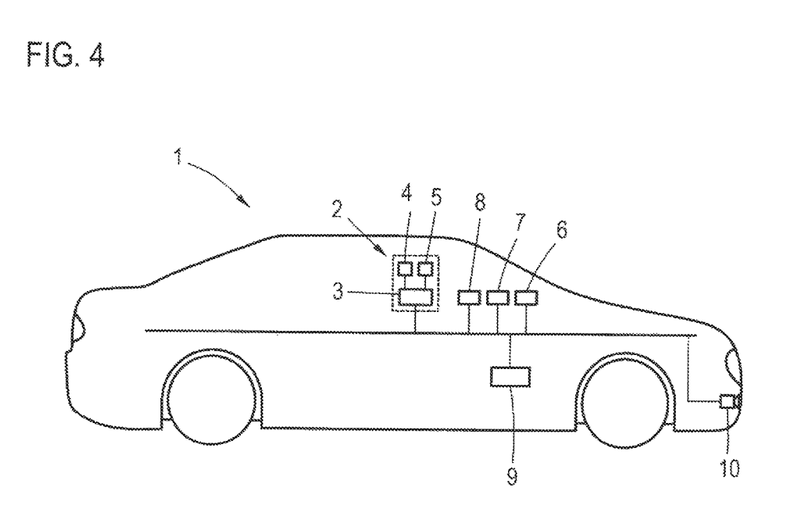
FIG. 4 is a view of a motor vehicle including a speech dialogue device.

Referring again to the drawings, FIGS. 3A and 3B show a detailed flowchart of S12. In this flowchart, firstly in S18 the signals of further motor vehicle systems are acquired. These can be, as shown in FIG. 4, in particular a navigation system 8, a communication device 7, a radio 6 and/or a driver assistance system 9 which evaluates a driving situation of the motor vehicle 1.

In S19 it is determined whether an interrupt condition is satisfied. An interrupt condition is satisfied in the case in which at least one of the motor vehicle systems whose signals have been acquired in S18 sends an interrupt signal. Additionally or alternatively, in S19 further interrupt conditions could also be checked, for example whether a further passenger of the motor vehicle is speaking, whether the user speaks without continuing the speech dialogue and whether a certain minimum time during which no piece of information has been acquired has passed since the last voice output of the speech dialogue device. If no interrupt condition is present, the method is continued from S18.

In S20 a timing process is started or a time counter is reset. The time counter serves in the method shown for acquiring the total length of the interrupt of the speech dialogue when the interrupt ends, that is to say when the interrupt condition is eliminated, and therefore serves to control the generation and outputting of the summary output as a function of the total length.

In S21, the execution of the dialogue, that is to say the execution of S1 to S8, is stopped and the instantaneous state of the dialogue is stored. For this purpose, at least the pieces of information already acquired and the associated pieces of meta-information are stored. In addition, the last voice output or further preceding voice outputs can be also stored by the speech dialogue device, the addressed function and/or the process within a dialogue at which the dialogue is at that particular time. Depending on the specific embodiment of the storage dialogue device, S21 can, under certain circumstances, be omitted, since a state of a dialogue is, under certain circumstances, present in the memory in any case. However, since under certain circumstances a further dialogue could be carried out during the interrupt, separate storage of the state of the dialogue is generally advantageous.

In S22 the signals of further devices which are connected to the speech dialogue device are acquired again, and in S23 it is checked again whether the interrupt condition is satisfied. S22 and S23 therefore correspond to S18 and S19. However, in this context a repetition of S22 and S23 takes place as long as the interrupt condition is satisfied. As soon as the interrupt condition is no longer satisfied, the method is continued with S24. In S24, the timer which has been started in S20 is initially stopped, and the value of the timer is read out. Therefore, in S24 the duration for which the interrupt was present is acquired.

Subsequently, in S25 it is checked whether the dialogue which was interrupted in S21 is to be continued. In this context, the duration of the interrupt is evaluated. If the duration is greater than a predefined limiting value, the dialogue is interrupted in S26 and can be started again by the user in S1. Other conditions can also cause the dialogue to be aborted. For example, a dialogue should typically not be continued in a motor vehicle if a user has left the vehicle between the start of the interrupt and the end of the interrupt. It is also possible that further operator control inputs of a user make a dialogue invalid. For example, it is possible for a station selection not to be made if the user has previously switched off the radio.

If it has been determined in S25 that the dialogue is to be continued, in S27 a complexity value is determined. The complexity value is a measure of the loading of a user by the event causing the interrupt. The complexity value is determined here as a function of the connected device which outputs the signal which causes the interrupt condition to be satisfied. Alternatively or additionally it would also be possible to determine the complexity value as a function of a device complexity value determined by the connected device or to take into account the pieces of information to be acquired or at least one of the pieces of information which have already been acquired during the determination of the complexity value.

In S28, the repetition condition is subsequently evaluated and it is determined as a function of the duration acquired in S24 and the complexity value determined in S27 whether a natural speech summary output is to be generated and output as a voice output. In this context, a value which is compared with a predefined limiting value is determined as a function of the duration and the complexity value. The determination of the value can be determined here by using a two-dimensional value table, calculating a weighted sum, forming products or other functions which depend on the duration, the complexity value and optionally further parameters.

If it is determined in S28 that the repetition condition is not satisfied, in S30 the state of the dialogue is restored. In this context, the values stored in S21 are reloaded. The state of the dialogue is changed here in such a way that the dialogue is continued with the last preceding process S6 from FIG. 1A, that is to say with the last preceding voice output using the speech dialogue device.

If it is determined in S28 that a natural speech summary output is to be generated and output as a voice output, this takes place in S29. The generation and outputting of the summary output takes place as explained with respect to FIG. 2. If a state of a dialogue has been protected in S21, the state of the dialogue is restored before the jump back, as is explained with respect to the S17 in FIG. 2.

Referring again to the drawings, FIG. 4 shows a schematic view of a motor vehicle 1 including a speech dialogue device 2 which is designed to carry out the method described above. The speech dialogue device 2 includes here a control device 3 and a voice input device 4 which can be embodied as a microphone with an assigned analog-digital converter, and the voice output device 5, which can be embodied as a loudspeaker with an assigned digital-analogue converter. The control device 3 is connected to further components of the motor vehicle via a vehicle bus, for example a CAN bus. The further components may include a radio 6, a communication device 7, a navigation device 8 and a driver assistance system 9 which evaluates a traffic situation which is acquired by sensors of the motor vehicle, of which the camera 10 is shown by way of example. The radio 6, the communication device 7 and the navigation device 8 can be controlled using the speech dialogue device 2. For example, navigation destinations can be predefined to the navigation device 8, a transmitter selection, a volume selection and further operator control functions can be carried out for a radio 6 by using speech commands, and the communication device 7 can, in particular, be controlled to make or accept calls. In addition, an address book and an appointment planner can be integrated into the communication device 7, wherein the addition and editing of entries of the address book and of the appointment planner are also possible by using speech commands using the speech dialogue device 2.

For some of the voice controllers, a plurality of pieces of information including information content to be linked are to be acquired. If, for example, a new entry needs to made in the address book which is integrated into the communication device 7, a first name, a family name, an address, which in turn may include a road, house number and location, as well as at least one telephone number, are to be acquired. In order to acquire complex inputs in this way, the speech dialogue device 2 can in each case interrogate further missing pieces of information from the user by using a voice output whenever pieces of information are acquired using a voice input of the user.

However, this multi-part dialogue can be interrupted as a function of signals of the other vehicle devices. For example, a speech dialogue is to be interrupted if the navigation system 8 outputs a navigation instruction, a traffic message is received and output by the radio 6, a call is received and/or accepted at the communication device 7 or the driver assistance system acquires a complex traffic situation which requires the driver's complete attention. Therefore, there is provision that the radio 6, the communication device 7, the navigation system 8 as well as the driver assistance system 9 can transmit interrupt signals to the speech dialogue device 2 via the vehicle bus. The speech dialogue device is designed here, as explained with respect to FIG. 1A to FIG. 3B, to generate, after the elimination of the interrupt signal and therefore conclusion of any such interrupt, a natural speech summary output and output it as a voice output which summarizes the previous dialogue. In this context, the verbosity of the summary output is adapted as a function of the duration of the interrupt and of a complexity value. The complexity value is determined here as a function of whichever of the further devices has sent an interrupt signal. The navigation system 8, the communication system 7 and the radio 6 are assigned fixed complexity values here. The driver assistance system 9 determines independently a device complexity value as a function of the traffic situation, and transmits the value with the interrupt signal to the speech dialogue device 2.

In addition, the speech dialogue device 2 can then also generate a natural speech summary output and output it as a voice output if a corresponding voice command of a user has been acquired.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for acquiring pieces of information including information content to be linked, the method comprising:
    acquiring the pieces of information, using a speech dialogue device, by natural voice input data and by extracting respective pieces of information from the natural voice input data using a speech recognition algorithm;
    producing, by the speech dialogue device, a voice output between each acquisition of the pieces of information;
    generating, by the speech dialogue device when a repetition condition has been satisfied, a natural speech summary output and producing a voice output including a natural voice reproduction of the natural speech summary output which includes at least a part of at least one previously acquired piece of information or a derived piece of information derived from the at least one previously acquired piece of information, a necessary condition for the satisfaction of the repetition condition being that an initially satisfied interrupt condition, during the satisfaction of which the acquiring of the pieces of information is interrupted, is no longer satisfied;
    determining, by the speech dialogue device when a plurality of pieces of information have been acquired when the repetition condition was satisfied and based on a repetition parameter for the plurality of pieces of information, whether the natural voice reproduction of at least a part of the plurality of pieces of information or a derived piece of information derived from the plurality of pieces of information is incorporated into the natural speech summary output;
    determining, by the speech dialogue device, at least one of a duration of the interrupt condition and a complexity value corresponding to a measure of a load on a user by an event causing the interrupt when the interrupt condition is satisfied; and
    determining the repetition parameter based on at least one of the duration and the complexity value.

2. The method as claimed in claim 1, further comprising determining whether the repetition condition is satisfied based on at least one of a number of the previously acquired pieces of information, the previously acquired pieces of information, the duration of the interrupt condition, and the complexity value.

3. The method as claimed in claim 1, further comprising:
    determining the repetition parameter based on the complexity value; and
    determining whether the interrupt condition is satisfied based on a signal of a device connected to the speech dialogue device,
    wherein the device transmits a device complexity value used to determine the complexity value.

4. The method as claimed in claim 1, further comprising:
determining the repetition parameter based on the complexity value; and
determining whether the interrupt condition is satisfied based on signals of a plurality of devices connected to the speech dialogue device,
wherein the determining the complexity value is based on at least one of the connected devices which output at least one signal among the signals which cause the interrupt condition to be satisfied.

5. The method as claimed in claim 1, wherein the determining the complexity value is based on at least one of the pieces of information to be acquired or at least one of the previously acquired pieces of information.

6. A speech dialogue device for a motor vehicle, comprising:
a voice input device configured to acquire natural voice input data;
a voice output device configured to produce a voice output between each acquisition of pieces of information extracted from the natural voice input data; and
a controller configured to:
acquire the pieces of information, including information content to be linked, by extracting the pieces of information from the natural voice input data using a speech recognition algorithm,
generate, when a repetition condition has been satisfied, a natural speech summary output and produce a voice output including a natural voice reproduction of the natural speech summary output which includes at least a part of at least one previously acquired piece of information or a derived piece of information derived from the at least one previously acquired piece of information, a necessary condition for the satisfaction of the repetition condition being that an initially satisfied interrupt condition, during the satisfaction of which the acquiring of the pieces of information is interrupted, is no longer satisfied,
determine, when a plurality of pieces of information have been acquired when the repetition condition was satisfied and based on a repetition parameter for the plurality of pieces of information, whether the natural voice reproduction of at least a part of the plurality of pieces of information or a derived piece of information derived from the plurality of pieces of information is incorporated into the natural speech summary output,
determine at least one of a duration of the interrupt condition and a complexity value corresponding to a measure of a load on a user by an event causing the interrupt when the interrupt condition is satisfied, and
determine the repetition parameter based on at least one of the duration and the complexity value.

7. A motor vehicle, comprising:
a chassis; and
a speech dialogue device including:
a voice input device configured to acquire natural voice input data;
a voice output device configured to produce a voice output between each acquisition of pieces of information extracted from the natural voice input data; and
a controller configured to:
acquire the pieces of information, including information content to be linked, by extracting the pieces of information from the natural voice input data using a speech recognition algorithm,
generate, when a repetition condition has been satisfied, a natural speech summary output and produce a voice output including a natural voice reproduction of the natural speech summary output which includes at least a part of at least one previously acquired piece of information or a derived piece of information derived from the at least one previously acquired piece of information, a necessary condition for the satisfaction of the repetition condition being that an initially satisfied interrupt condition, during the satisfaction of which the acquiring of the pieces of information is interrupted, is no longer satisfied,
determine, when a plurality of pieces of information have been acquired when the repetition condition was satisfied and based on a repetition parameter for the plurality of pieces of information, whether the natural voice reproduction of at least a part of the plurality of pieces of information or a derived piece of information derived from the plurality of pieces of information is incorporated into the natural speech summary output,
determine at least one of a duration of the interrupt condition and a complexity value corresponding to a measure of a load on a user by an event causing the interrupt when the interrupt condition is satisfied, and
determine the repetition parameter based on at least one of the duration and the complexity value.

8. The motor vehicle as claimed in claim 7, further comprising at least one vehicle system which, when a signal condition is satisfied, outputs an interrupt signal to the speech dialogue device to satisfy the interrupt condition.

9. The motor vehicle as claimed in claim 8, wherein the at least one vehicle system includes at least one of a communication device, a radio, a driver assistance system configured to evaluate a traffic situation, and a navigation system.

10. The motor vehicle as claimed in claim 9, wherein
the at least one vehicle system includes the driver assistance system, and
the driver assistance system is further configured to determine a device complexity value based on the traffic situation when the interrupt signal is output by the at least one vehicle system.

11. The motor vehicle as claimed in claim 7, wherein
the pieces of information acquired via the voice input device are used to control at least one function of the motor vehicle,
the interrupt condition is satisfied before all of the pieces of information are acquired,
the speech dialogue device selects a structure for the natural speech summary output from among a plurality of possible structures of natural speech summary outputs, the natural speech summary output including at least a part of the pieces of information acquired before the interrupt condition was satisfied, and
a remaining part of the pieces of information acquired via the voice input device are acquired after the interrupt condition is no longer satisfied and after the voice output device produces the voice output including the natural voice reproduction of the natural speech summary output.

12. The motor vehicle as claimed in claim 7, wherein
the controller determines the repetition parameter based
on the duration for which the interrupt condition is
present, and the controller determines the repetition condition is satisfied if the duration for which the interrupt condition is present is greater than a predefined duration.

13. The motor vehicle as claimed in claim 7, wherein
the controller determines the repetition parameter based
on the complexity value, and a content of the natural speech summary output increases as the load on the user increases.

\* \* \* \* \*